United States Patent
DeGuise et al.

(10) Patent No.: US 9,142,020 B2
(45) Date of Patent: Sep. 22, 2015

(54) OSTEO-ARTICULAR STRUCTURE

(75) Inventors: Jacques A. DeGuise, Montreal (CA);
Benoit Godbout, Montreal (CA);
Thierry Cresson, Monteal (CA);
Ramnada Chav, Laval (CA); Dominic Branchaud, Montreal (CA); Wafa Skalli, Paris (FR); David Mitton, Lyons (FR)

(73) Assignees: Ecole National Superieure D'Arts Et Metiers (ENSAM), Paris (FR); Ecole De Technologies Superieure, Montreal, Quebec (CA)

( * ) Notice: Subject to any disclaimer, the term of this patent is extended or adjusted under 35 U.S.C. 154(b) by 803 days.

(21) Appl. No.: 12/740,836

(22) PCT Filed: Oct. 31, 2008

(86) PCT No.: PCT/IB2008/002929
§ 371 (c)(1),
(2), (4) Date: Apr. 30, 2010

(87) PCT Pub. No.: WO2009/056970
PCT Pub. Date: May 7, 2009

(65) Prior Publication Data
US 2010/0241405 A1  Sep. 23, 2010

(30) Foreign Application Priority Data
Nov. 2, 2007 (EP) .................................. 07301522

(51) Int. Cl.
*G06G 7/48* (2006.01)
*G06T 7/00* (2006.01)

(52) U.S. Cl.
CPC ..... *G06T 7/0028* (2013.01); *G06T 2207/10116* (2013.01); *G06T 2207/30012* (2013.01)

(58) Field of Classification Search
CPC ........... G06T 2207/10116; G06T 2207/30012;
G06T 7/0028; G06T 2200/00; G06T 1/0007;
G06T 11/00; G06T 2200/04; G06T 2211/00;
G06T 7/0024; G06T 7/0038
USPC ......................................................... 703/2, 6
See application file for complete search history.

(56) References Cited

U.S. PATENT DOCUMENTS 5,959,302 A  9/1999  Charpak
7,194,295 B2  3/2007  Vilsmeier
(Continued)

FOREIGN PATENT DOCUMENTS

EP  1 348 393  10/2003
EP  1 348 394  10/2003
(Continued)

OTHER PUBLICATIONS

Zollei et al. (2D-3D Rigid Registration of X-Ray Fluoroscopy and CT Images Using Mutual Information and Sparsely Sampled Histogram Estimators, 2002).*
(Continued)

*Primary Examiner* — Dwin M Craig
*Assistant Examiner* — Andre Pierre Louis
(74) *Attorney, Agent, or Firm* — Frost Brown Todd LLC

(57) ABSTRACT

Method for reconstruction of a three-dimensional model of an osteo-articular structure of a patient, wherein a) bi-dimensional patient-specific image data (41) of said structure is provided; (d) a preliminary solution, corresponding to a previously established solution model of the structure, is provided (42) from a base (21), said preliminary solution comprising a priori knowledge of the corresponding structure, previously established from structures of the same type, said preliminary solution comprising surface data describing the coordinates of the surface of the solution model, and bulk data describing at least one characteristic of the inside of the solution model; the preliminary solution is modified (42', 43, 44, 46, 47, 48) to be brought in concordance with said patient-specific image data.

15 Claims, 6 Drawing Sheets

(56) References Cited

U.S. PATENT DOCUMENTS

| | | | |
|---|---|---|---|
| 7,596,254 B2* | 9/2009 | Liebschner et al. | 382/128 |
| 7,639,866 B2 | 12/2009 | Pomero et al. | |
| 8,160,201 B2* | 4/2012 | Banchet et al. | 378/53 |
| 2005/0004451 A1 | 1/2005 | Vilsmeier et al. | |
| 2005/0015003 A1 | 1/2005 | Lachner et al. | |
| 2006/0002630 A1 | 1/2006 | Fu | |
| 2008/0031400 A1* | 2/2008 | Beaulieu et al. | 378/4 |
| 2010/0256504 A1* | 10/2010 | Moreau-Gaudry et al. | 600/476 |

FOREIGN PATENT DOCUMENTS

| | | |
|---|---|---|
| FR | 2 749 402 | 12/1997 |
| FR | 2 754 068 | 4/1998 |
| FR | 2 810 769 | 12/2001 |
| WO | WO 01/78015 | 10/2001 |
| WO | WO 2004/111948 | 12/2004 |
| WO | WO 2008/146069 | 12/2008 |

OTHER PUBLICATIONS

Benameur, S. et al., "3D Biplanar Reconstruction of Scoliotic Vertebrae Using Statistical Models," Proceedings of the 2001 IEEE Computer Society Conference on Computer Vision and Pattern Recognition,, vol. 2 (2001) pp. 11-577-11-582.

Benameur, S. et al., "3D/2D registration and segmentation of scoliotic vertebrae using statistical models," Science Digest, vol. 27 (2003) pp. 321-337.

Benameur, S. et al., "A Hierarchical Statistical Modeling Approach for the Unsupervised 3D Biplanar Reconstruction of the Soliotic Spine," IEEE Transactions on Biomedical Engineering, vol. 52(12) (Dec. 2005) pp. 2041-2057.

Delorme, S. et al., "Three Dimensional Modelling and Rendering of the Human Skeletal Trunk from 2D Radiographic Images," IEEE (1999) pp. 497-505.

Eberly, D. et al., "Ridges for Image Analysis," J. of Mathematical Imaging and Vision, vol. 4(4) (1994) pp. 353-373.

Fleute, M. et al., "Nonrigid 3-D/2-D Registration of Images Using Statistical Models," University Joseph Fourier, Genoble, France (1999) pp. 138-147.

Gargouri, I. et al., "Reconstruction 3D des os du genou par rétroprojections radiographiques multiplanes," (Oct. 2-5, 1991) p. 60.

Kyehyun, K. et al., Fast 2D-3D registration using GPU-based preprocessing, IEEE (Jun. 23, 2005) pp. 139-143.

International Search Report dated May 22, 2009 for Application No. PCT/IB2008/002929.

Eurppean Search Report dated Apr. 8, 2008 for Application No. EP 07 30 1522.

Livyatan, H. et al, "Gradient-Based 2-D/3-D Rigid Registration of Fluoroscopic X-Ray to CT," IEEE Transactions on Medical Imaging, vol. 22(11) (Nov. 2003) pp. 1395-1406.

Lötjönen, J., "Construction of Boundary Element Models in Bioelectromagnetism," Thesis, Dept. of Engineering Physics and Mathmatics, Helsinki University of Technology (2000) pp. 1-55.

Lötjönen, J., "Reconstruction of 3-D Geometry Using 2-D Profiles and a Geometric Prior Model," IEEE Transactions on Medical Imaging, vol. 18(10) (Oct. 1999) pp. 992-1002.

Messmer, P. et al., "Volumetric Model Determination of the Tibia Based on 2D Radiographs Using a 2D/3D Database," Computer Aided Surgery, vol. 6 (2001) pp. 183-194.

Notification of International Search Report and Written Opinion dated May 22, 2009 for Application No. PCT/IB2008/002929.

Tang, T.S.Y. et al, 2D/3D Deformable Registration Using a Hybrid Atlas, J. Duncan & G. Gerig (Eds.) (2005) pp. 223-230.

Trochu, F., "A Contouring Program Based on Dual Kriging Interpolation," Engineering with Computers, vol. 9 (1993) pp. 160-177.

International Written Opinion dated May 22, 2009 for Application No. PCT/IB2008/002929.

European Written Opinion dated Apr. 22, 2008 for Application No. EP07301522.

* cited by examiner

OSTEO-ARTICULAR STRUCTURE

The present application is a U.S. National Entry, under 35 U.S.C. 371, of PCT International Application No. PCT/IB2008/002929, filed Oct. 31,2008; which claims priority from EPO Patent Application No. 07301522.4, Nov. 2,2007.

FIELD OF THE INVENTION

The present invention relates to a method for reconstruction of a three-dimensional model of an osteo-articular structure.

BACKGROUND OF THE INVENTION

In particular, the present invention is related to a method for reconstruction of a three-dimensional model of an osteo-articular structure, e.g. human spine, based on two-dimensional patient-specific detection data of the structure, e.g. two calibrated radiographs, and on a previously established preliminary solution corresponding to a solution model of the structure. The preliminary solution initially comprises a priori knowledge of the structure, established from structures of the same type. The preliminary solution is further modified using the two-dimensional patient-specific detection data.

The preliminary solution consists of surface data describing coordinates of a three-dimensional surface of the solution model.

Projected model data are obtained from a simulated projection of the solution model from a simulated source point. The projected model data and the detection data are processed so as to detect marks, e.g. edges, end points, segments etc. Some marks of the detection data are matched with marks of the solution model.

In a registration step, the modifications to apply to the solution model so as to bring the matched marks into concordance are estimated. The solution model is subsequently modified.

The projection, the processing, the matching, the registration and the modification are repeated iteratively. When the projected model data fit enough with the detection data, the model of the object is considered as reconstructed.

However, the two-dimensional patient-specific image data may be relatively blurred, unlike the projected data obtained from the projection of the solution model. The matching may thus be performed with a relatively low accuracy, and the subsequent registration might be biased.

The instant invention has notably for object to facilitate reconstruction from patient-specific data.

SUMMARY OF THE INVENTION

To this aim, the invention relates to a method for reconstruction of a three-dimensional model of an osteo-articular structure of a patient, wherein (a) bi-dimensional patient-specific image data of said structure is provided;

(b) a preliminary solution, corresponding to a previously established solution model of the structure, is provided from a base, said preliminary solution comprising a priori knowledge of the corresponding structure, previously established from structures of the same type, said preliminary solution comprising surface data describing the coordinates of the surface of the solution model, and bulk data describing at least one characteristic of the inside of the solution model;

(c) the preliminary solution is modified to be brought in concordance with said patient-specific image data.

The preliminary solution hence includes value(s) of characteristic(s) of the inside of the solution model. This or these characteristic(s), e.g. a density of an outer bone, typically have an influence on the patient-specific data. Bringing in concordance the preliminary solution with the patient-specific image data may thus be easier with such a pseudo-volume solution model than in Prior Art.

Furthermore, the preliminary solution may be relatively simple and easy to process.

The bulk data may be used to match one or more marks obtained from the patient-specific image data with one or more marks obtained from the preliminary solution. The preliminary solution may be modified so as to bring in concordance the matched marks. By "bringing in concordance" we mean either that after the modification, the matched marks are brought closer one to the other, or even coincide.

The bulk data may for example comprise thickness data relating to a thickness of an outer layer of the solution model, e.g. an outer bone. That is, the characteristic(s) described by the bulk data comprise(s) the thickness of the outer layer. More generally, this characteristic may comprise the thickness (or any other dimension) of any layer or region of the solution model.

The bulk data may for example comprise density data relating to a density of a portion of the solution model, e.g. the density of the outer bone. That is, the characteristic(s) described by the bulk data comprise(s) the density of the outer layer.

For example, the outer bone may be a cortical bone of a femur.

Advantageously, two-dimensional simulation data are obtained by simulating acquisition from at least one source on the preliminary solution, the position of the simulated source being obtained from the position of a source when acquiring the patient-specific data, the simulated acquisition taking into account the bulk image data. The simulation data and the patient-specific data may therefore have a relatively resembling aspect.

The patient-specific image data may be detection data obtained from a detector device.

For example, the detection data may be radiographies. Advantageously, the simulation is performed using an equation of X-rays (or any other rays) attenuation as a function of properties of the crossed tissues, at least one value of theses properties being given by the bulk data. For example, as X-rays are relatively sensitive to density, simulating radiography from a preliminary solution that includes at least one value of a density may allow obtaining simulation data that look like radiography, unlike the geometrical projections of the Prior Art.

In an embodiment, the detection data may comprise at least one bone mineral density image obtained from a subtraction of a first image from a second image, the first image and the second image being respectively obtained from low energy X-rays and high energy X-rays. The simulation may comprise subtracting a first simulated image from a second simulated image, the first simulated image and the second simulated image being respectively obtained from equations of low energy and high energy X-rays respectively. The present invention is by no means limited to images obtained from a subtraction of images.

The present invention is by no means limited to bulk data comprising thickness data and/or a density data, nor by a simulation of radiography. For example, the bulk data may comprise inner surface data describing the coordinates of an inner surface of the solution model, e.g. the inner surface of a cortical bone. In this case, in step (c), projection data may be obtained from geometrical projection(s) of both surfaces from at least one source. Since the regions of highest intensity in the radiographies are due to an attenuation of the X-rays when crossing a relatively thick cortical bone, the projections of the outer surface and the inner surface of the modelled cortical bone may allow highlighting the regions corresponding to thick cortical bone, thus allowing a more pertinent reconstruction than in Prior Art.

Advantageously, in step (c), the preliminary solution is modified such that the corresponding solution model has a position and an orientation that is roughly consistent with the patient specific data.

Advantageously, step (c) further comprises:
processing the patient-specific image data so as to extract marks,
processing the simulation data so as to extract marks,
matching at least one mark obtained from the simulation data with at least one mark obtained from the patient-specific image data, based on the extracted marks,
estimating modifications to apply to the preliminary solution so as to bring in concordance said matched marks, and
modify the preliminary solution according to the estimated modifications.

The present invention is not limited by these steps, nor by the positioning and orienting step.

The processing steps may comprise segmenting the patient-specific image data and the simulation data respectively. The three-dimensional solution model may also be segmented. These segmentations allows step (c) being performed relatively rapidly, with a resulting reconstruction relatively accurate and robust against matching errors. It may be particularly advantageous to perform segmentations in case of a relatively complex structure to be reconstructed, such as the spine for example.

Alternatively, the processing steps may comprise extracting particular geometrical features using an intensity-based method, thus allowing a relatively accurate reconstruction. The intensity-based method may rely on comparisons of intensities between the patient-specific data and the simulation data, and/or gradients correlations etc.

Step (c) may be at least partially iteratively repeated until the modified solution model fits enough with the detection data. The preliminary solution and the solution model in a subsequent iteration are obtained from the modification(s) performed at the previous iteration.

Advantageously, during step (c), the solution model is modified by applying one or more of the following:
a three-dimensional rigid transformation to the solution model,
a three-dimensional linear deformation to the solution model,
a three-dimensional non-linear deformation to the solution model.

Advantageously, the detection data comprise two calibrated bi-dimensional radiographs of the body structure taken from different orientations. The orientations may be perpendicular (or substantially perpendicular) to each other.

The osteo-articular structure may comprise one or more objects. The structure may for example be a femur, or a vertebral column comprising a plurality of vertebra.

Such a method can be relied upon by medical end users such as surgeons for diagnostic and/or preoperative planning for example. It could be quick enough to enable for example real time reconstruction for computer-assisted navigation applications based on intra-operative detection data during surgery.

According to another aspect, the invention relates to a computer program product comprising instructions for causing a programmable unit to perform the above methods when executed on said programmable unit.

According to another aspect, the invention provides a computer program product comprising a base of at least one preliminary solution corresponding to a solution model of a structure. The base is for use in a method for reconstruction of a three-dimensional model of a patient-specific osteo-articular structure based on patient-specific image data. The at least one preliminary solution comprises a priori knowledge of the corresponding structure, previously established from structures of the same type. At least one preliminary solution comprises surface data describing the coordinates of the surface of the solution model, and bulk data describing at least one characteristic of the inside of the solution model.

According to a further aspect, the invention relates to a reconstruction device for reconstructing a three-dimensional model of an osteo-articular structure of a patient based on two-dimensional patient-specific image data of said structure. The reconstruction device comprises estimating means to estimate the modifications to apply on a previously established preliminary solution corresponding to a solution model of the structure, the preliminary solution comprising a priori knowledge of the corresponding structure, previously established from structures of the same type, so as to bring the preliminary solution in concordance with said patient-specific image data. The preliminary solution comprises surface data describing the coordinates of the surface of the solution model, and bulk data describing at least one characteristic of the inside of the solution model. The reconstruction device further comprises processing means to apply the estimated modification(s) to the preliminary solution.

The estimating means and the processing means may be part of a same processor. Alternatively, the estimating means and the processing means may be separate devices, e.g. a controller and a DSP (Digital Signal Processor) respectively.

BRIEF DESCRIPTION OF THE DRAWINGS

Other characteristics and advantages of the invention will readily appear from the following description of three of its embodiments, provided as non-limitative examples, and of the accompanying drawings.

On the drawings.

On the different figures, the same reference signs designate like or similar elements.

DETAILED DESCRIPTION

Figure 1:
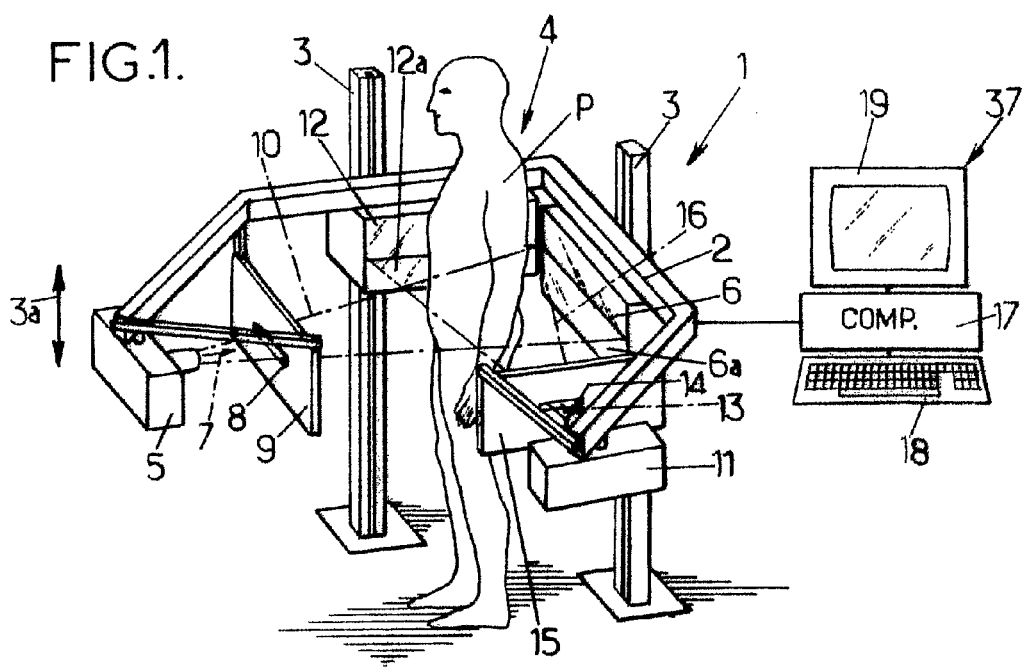
FIG. 1 is a perspective view of an example of a reconstruction apparatus according to an embodiment of the invention.

FIG. 1 shows a radiographic apparatus 1 for three-dimensional reconstruction, the apparatus comprising a moving frame 2 displaceable under motor drive along vertical guides 3 in both directions of translation 3a.

The frame surrounds a field of observation 4 in which a patient P may be placed, e.g. standing, for observing an osteo-articular structure of the patient when in the standing position, which may be important for patients suffering from scoliosis, for example.

The moving frame 2 carries a first radiological source 5 and a first detector 6 which is placed facing the source 5 beyond the field 4, and which comprises at least one horizontal line 6a of detector cells. By way of example, the detector 6 may be a gas detector responsive to low doses of radiation, e.g. as described in documents FR-A-2 749 402 or FR-A-2 754 068. Naturally, other types of detectors may optionally be used in the context of the present invention.

The radiological source 5 is adapted to emit ionizing radiation, in particular X-rays, suitable for being detected by the detector 6 in an image-taking direction 7 that is antero-posterior or postero-anterior relative to the patient P, the rays passing through a horizontal slit 8 made through an aiming mask 9 such as a metal plate in order to generate a horizontal beam 10 of ionizing radiation in the field of observation 4.

The moving frame 2 also carries a second radiological source 11 similar to the source 5 and a second detector 12 similar to the detector 6, disposed facing the source 11 beyond the field 4, and comprising at least one horizontal line 12a of detector cells.

The radiological source 11 is adapted to emit ionizing radiation in a image-taking direction 13 that is lateral relative to the patient P, passing through a horizontal slit 14 formed in an aiming mask 15 such as a metal plate in order to generate a horizontal beam 16 of ionizing radiation in the field of observation 4.

Naturally, there could be more than two radiological sources and detectors, and the image-taking directions of these various radiological sources could, where appropriate, be other than mutually perpendicular, and they need not even be horizontal.

The two detectors 6, 12 are connected to a computerized system 37 or some other electronic control system fitted with:
an input interface comprising at least a keyboard 18 and generally also a mouse (not shown);
an output interface comprising at least a screen 19;
a reconstruction device, e.g. a processor 17, for executing a computer program adapted to implement the method described herein; and
a knowledge base 21 of the structure to be reconstructed.

The microcomputer 37 may also be connected to the motor-driven drive means (not shown) contained in the guide 3, and to the sources 5 and 11, so as to control vertical displacement of the frame and the emission of ionizing radiation.

By way of example, the reconstruction method which is described after is a reconstruction method of the human spine using a knowledge base of spines. However, this method could be used for reconstruction of any osteo-articular structure of the body such as for example, the femur, the upper limb, the lower limb, the hip, or even part or totality of the skeleton, when a knowledge base of the structure to be reconstructed is provided.

Figure 2:
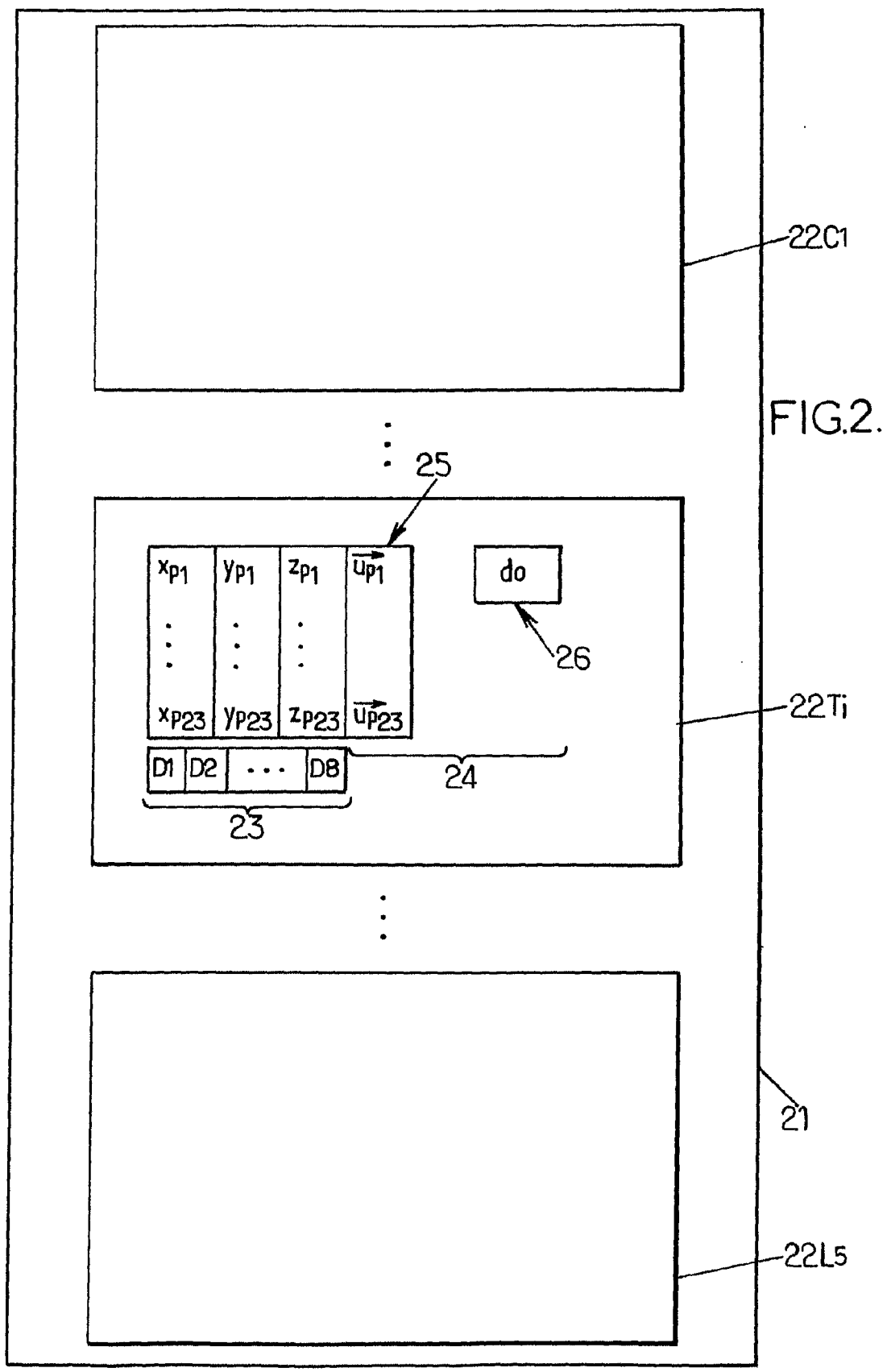
FIG. 2 is a schematic view of an example of a database according to an embodiment of the invention.

As an example shown on FIG. 2, the knowledge base 21 of the structure comprises a database for each of the objects of the structure to be reconstructed. In the example, where the structure to be reconstructed is the spine, the knowledge base 21 comprises a database for each of the vertebral bodies. As shown on FIG. 2, the database of the structure 21 comprises the database $22_{C1}$ corresponding to a solution model of the first cervical vertebra, . . . a database corresponding to a solution model of each other vertebra, (e.g. a database $22_{Ti}$ corresponding to a solution model of the $i^{th}$ thoracic vertebra for the $i^{th}$ vertebra), . . . , and a database $22_{L5}$ corresponding to a solution model of the fifth lumbar vertebra.

For the sake of simplicity, only the database for the $i^{th}$ thoracic vertebra will be described in greater details.

For each object, the corresponding database may be constructed as or from data obtained from objects similar to the object to be reconstructed.

The database contains data relating a corresponding solution model. The database is arranged so as to store surface data 23 relating to coordinates of points belonging to a surface of a solution model, and bulk data 24 describing characteristics of the inside of the solution model.

In this example, the surface data 23 comprise information about points corresponding to particular reference marks on objects of the same type of the object to be reconstructed, acquired beforehand, for example by computer tomography.

By way of example, the database of the $i^{th}$ vertebra Ti contains the coordinates $x_{P1}, y_{P1}, Z_{P1}, \ldots, x_{P23}, y_{P23}, Z_{P23}$, of characteristic points P1, . . . P23 for the $i^{th}$ vertebra of each of a plurality of patients, characteristic lengths D1 . . . D8 for each vertebra, as shown in FIG. 3, segments, straight lines or arcs that are characteristics of the object, and/or outlines and edges of these particular vertebra.

Figure 3:
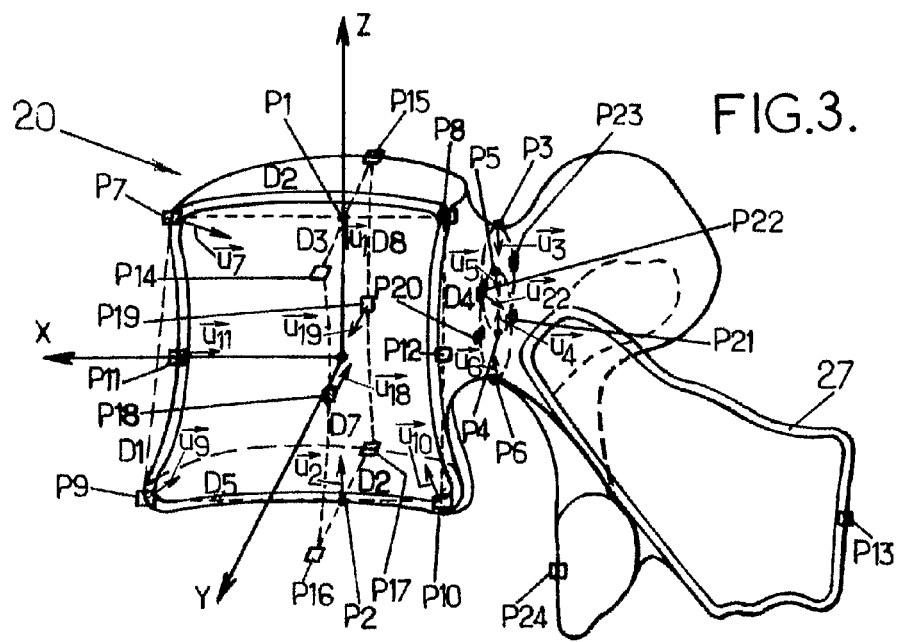
FIG. 3 is a perspective view of an example of a generic representation of a solution model for use in a method according to an embodiment of the invention.

As shown in FIG. 3, the coordinates of characteristic points or lines may be expressed, for example, in a local X, Y, Z frame of reference. In the example described, the axis Z corresponds to the axial direction of the vertebral column, the axis X is determined so as to define the antero-posterior plane of a vertebra model 20 along with axis Z, the axis Y being perpendicular to the above-mentioned axes X and Z. In addition, the origin O of the frame of reference is disposed in the middle between the two axial end faces of the main "tubular" portion of the vertebra model 20, the origin O also being positioned so that the axis Z passes through the upper axial face of the main portion of the vertebra model 20 at a reference feature P1 such that the distance between said reference feature P1 to the front end P7 of said axial face is equal to about two-thirds of the total distance between the front and rear ends P7 and P8 of the antero-posterior section of said top axial face.

In a not represented embodiment, the surface data may further comprise a mesh of several hundred to several hundred thousand points of a mean vertebra, and for each type of vertebra for example.

It is possible to establish a subset (not represented) of the database of vertebrae belonging to healthy individuals or to individuals suffering from scoliosis, and similarly it is possible to characterize each vertebra as a function of the weight, the size, the age, or any other type of parameter concerning the individual that is deemed to be necessary.

Alternatively, in a not represented embodiment, the surface data may comprise a mathematical model constructed from the previously acquired data. By way of example, the surface data may include statistical data (means, variances . . . ) for each parameter of the knowledge base. The surface data may include mathematical equations for determining from the knowledge base of a given vertebra, the positions of the characteristic points for a personalised reconstruction on the basis of values of estimator parameters for said object. For example, the coordinates of the characteristic points may be parameterized by functions of these parameters.

In the example illustrated in FIG. 2, the bulk data 24 comprise thickness data 25 relating to thickness of an outer bone (reference 27 on FIG. 3) of the modelled vertebra Ti, e.g. a cortical bone, and density data 26 relating to density of the outer bone.

For example, the density data 26 comprise a single value $d_0$ of a density of the outer bone.

For each characteristic point P1, ..., P23, the thickness data 25 may for example comprise values allowing to define vectors $\vec{u}_{P1}, \ldots, \vec{u}_{P23}$, having a direction normal to the surface at the corresponding point P1, ..., P23 and a magnitude corresponding to a thickness of the outer bone at this characteristic point P1, ..., P23.

The storage of the bulk data requires only little memory space in the database 21.

The database 21 is thus arranged so as to store bulk data relating to the inside of the solution model 20.

In an alternative embodiment (not represented), the bulk data include thickness data and density data that comprise a value of the local density of the outer bone for each characteristic point P1, ..., P23.

In a further alternative embodiment, the thickness data comprise a single value of a thickness of the outer bone.

In a further alternative embodiment, for each point of the surface of the solution model, the thickness data comprise a corresponding value of a thickness of the outer bone at this point.

In a further alternative embodiment, a cortical bone thickness value is provided for each anatomical region, e.g. the posterior rim, the pedicle, etc.

In a further alternative embodiment, the bulk data may comprise formulas allowing estimating the thickness and/or the density of the outer bone.

In a not represented embodiment, the bulk data may comprise data relating to a core of the modelled object, e.g. a density of a cancellous bone, dimensions of the cancellous bone, etc.

Referring back to FIG. 1, the microcomputer 37 is used initially to take two radiographic images of the patient P by causing the field of observation 4 to be scanned by the beams 10 and 16 of ionizing radiation over a height corresponding to the structure of the patient that is to be observed, for example the spine and the pelvis, or indeed the entire skeleton. For this purpose, the frame is preferably displaceable over a height of not less than 70 centimeters (cm), and preferably over at least one meter.

Figure 5:
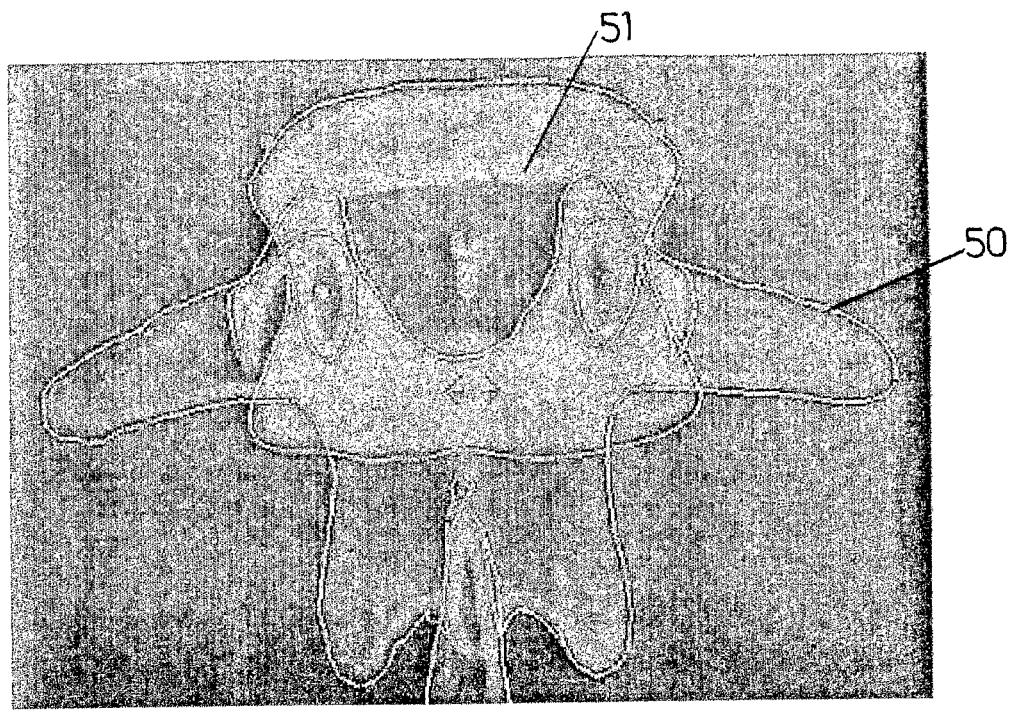
FIG. 5 is an exemplary view of a computer screen showing exemplary detection data, and showing geometrical projections data obtained with a method according to the Prior Art.

During this movement, two calibrated digital radio-graphic images of the portion of the patient under examination are stored in the memory of the microcomputer 37, for example an antero-posterior image and a lateral image respectively, wherein each images can be viewed on the screen 19 of the microcomputer, as shown in FIG. 5.

Figure 4:
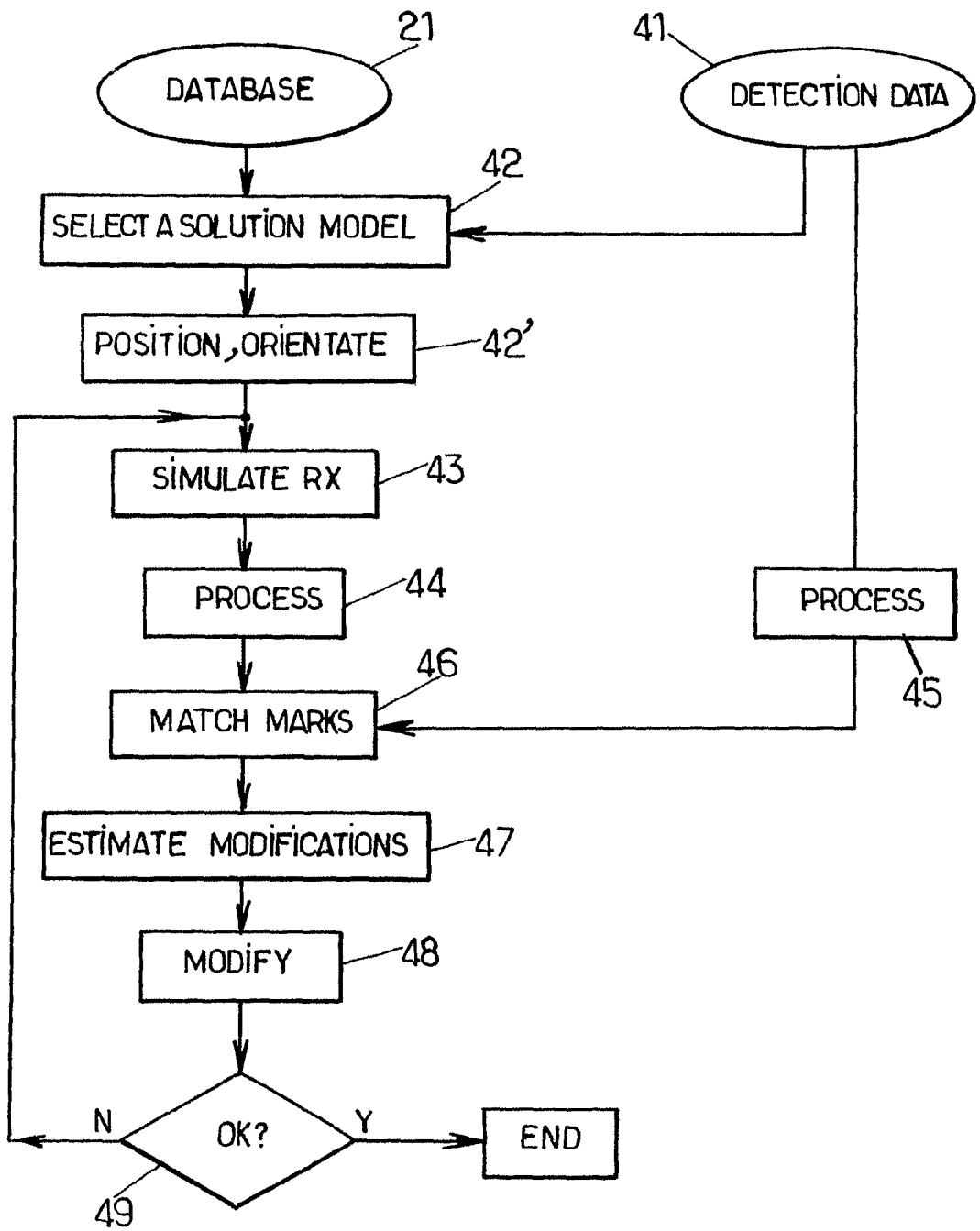
FIG. 4 is a flowchart of an exemplary method according to an embodiment of the invention.

FIG. 4 is a flow chart illustrating an exemplary method to be executed by a computer program product according to an embodiment of the invention. The computer program product may be stored in the processor 17 of FIG. 1. The processor 17 receives two-dimensional patient-specific detection data 41, i.e. the two radiographic images of the patient P. The processor 17 comprises or communicates with a memory that stores the database 21 shown in FIG. 2.

In a step 42, the processor selects a model solution of the database 21 from the detection data 41. The selection step may take into account parameters such as a previous radiography of a same patient, a knowledge of the part of the patient that is being imaged etc. to identify a model solution.

In an alternative embodiment, the selection step is performed by an operator.

In an alternative embodiment, the reconstruction apparatus is to be used for imaging a single type of structure, e.g. femurs, and the base 21 may contain data relative to a single solution model, e.g. of an healthy femur. In this case, the selection step is trivial.

The invention is by no means limited by the implementation of the selection step. More generally, the present invention is not limited by the way the preliminary solution is provided.

Referring back to FIG. 4, to the identified solution model corresponds a preliminary solution comprising data from the base, i.e. surface data and bulk data.

In a step 42', the model solution is positioned and oriented in a virtual 3D space. That is, the corresponding preliminary solution is modified accordingly. The position and the orientation of the model solution are determined so as to be roughly consistent with the detection data. One may subsequently expect the model solution to be virtually positioned between the source 5 on FIG. 1 and the detector 6, and between the source 11 and the detector 12.

In a step 43, the positioned and oriented model solution is used to simulate radiography detection from the sources 5, 11 on FIG. 1. The simulation may be performed using an equation of X-rays attenuation as a function of the thickness of the crossed tissues and of the properties of these tissues, such as their density.

Figure 6:
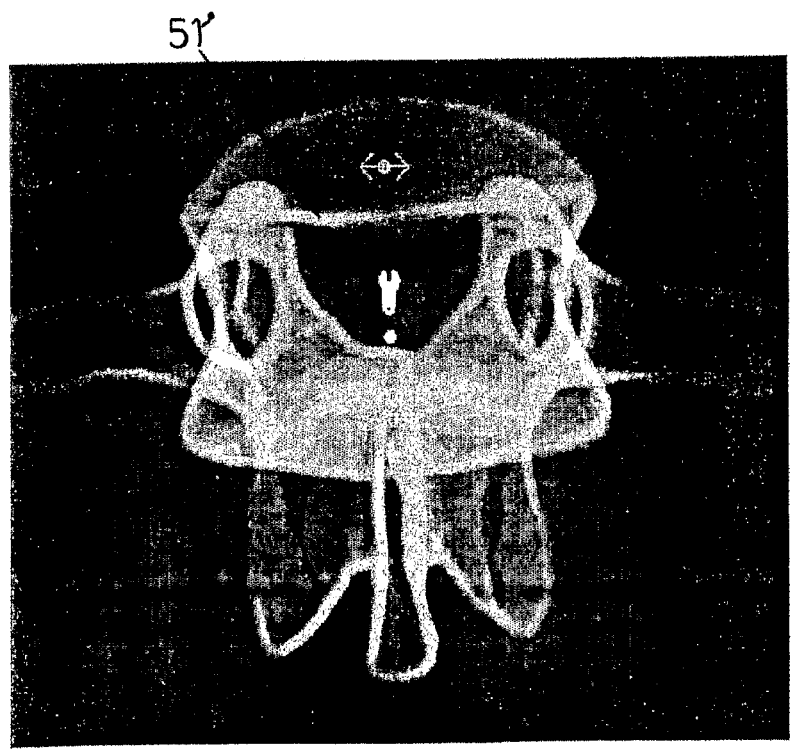
FIG. 6 is an exemplary view of a computer screen showing two-dimensional simulation data, according to an embodiment of the invention, FIGS. 7A and 7B schematically illustrate a reconstruction method according to an embodiment of the invention.

FIG. 6 shows a view of a computer screen showing two-dimensional simulation data. One may observe that the two-dimensional simulation data are relatively radiographies-like. That is, a relatively simple surface model allows obtaining simulation data that are relatively close to a real radiography.

On FIG. 5 is also shown a geometrical projection 50 of a surface model obtained with a method according to Prior Art. The simulated radiography of FIG. 6, obtained with the method according to an embodiment of the invention, has an aspect that is closer to the real radiography of FIG. 5 than the geometrical projection 50.

Furthermore, the regions having a higher density in the radiography, e.g. region 51, do not necessarily correspond to a portion of the geometrical projection 50. On the simulated radiography of FIG. 6, one may notice a region 51' that is likely to be extracted with an image processing and to be subsequently matched with the region 51 of FIG. 5.

Although only a single view is shown on FIG. 5 and FIG. 6, it is understood that two radiographic detections and two simulations are performed, from two sources.

In a step 44, the simulation data are processed so as to extract marks, e.g. edges or points.

In a step 45, the detection data are also processed, so as to extract marks, e.g. edges or points. Such processing is for example described in Gonzalez, R. C., Woods, R. E., *Digital Image Processing*, Second Edition, Prentice Hall.

In both steps 44 and 45, the marks may for example comprise ridges, points, gradients, edges, end points, segments, etc.

In a first embodiment, steps 44 and 45 comprise segmenting the simulation data and the detection data respectively. An exemplary segmenting method is described in Eberly, D., Gardner, R., Morse, B., Pizer, S., Scharlach, C., *Ridges for Image Analysis*, J. of Mathematical Imaging and Vision, 4(4): 353{373, 1994.

In a second embodiment, the extracted marks may be obtained by performing image processing based on the intensity. For example, the point within a determined window having a highest intensity, or which maximizes an intensity gradient, is considered as a mark. An exemplary intensity-based algorithm is described in Weese, J., et al., *An Approach to 2D/3D Registration of a Vertebra in 2D X-ray Fluoroscopes with 3D CT Images*, In Computer Vision and Virtual Reality in Medicine II-Medical Robotics and Computer Assisted Surgery III, 1997, France.

In Prior Art, a contour detection is performed to detect marks. The present invention hence allows using other methods, such as the intensity-based methods, that are possibly more effective.

In a step 46, the extracted marks are used to match marks obtained from the detection data with marks obtained from the simulation data.

Figure 7A:
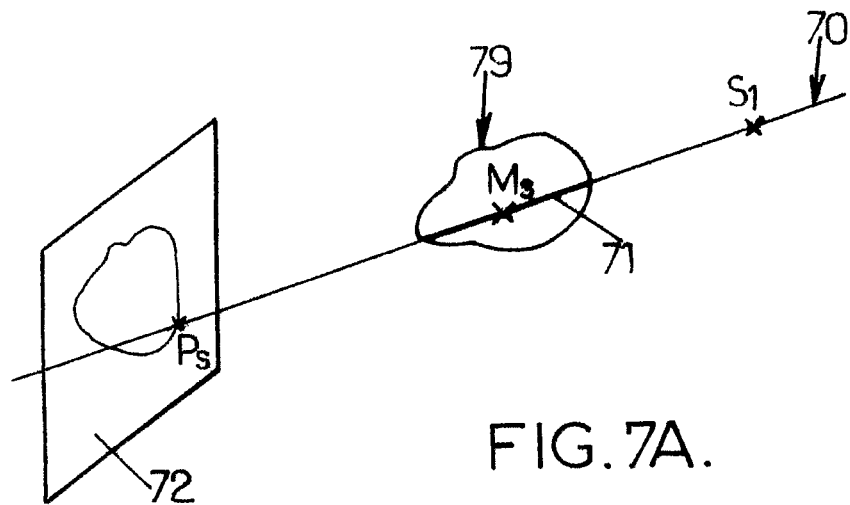
Figure 7B:
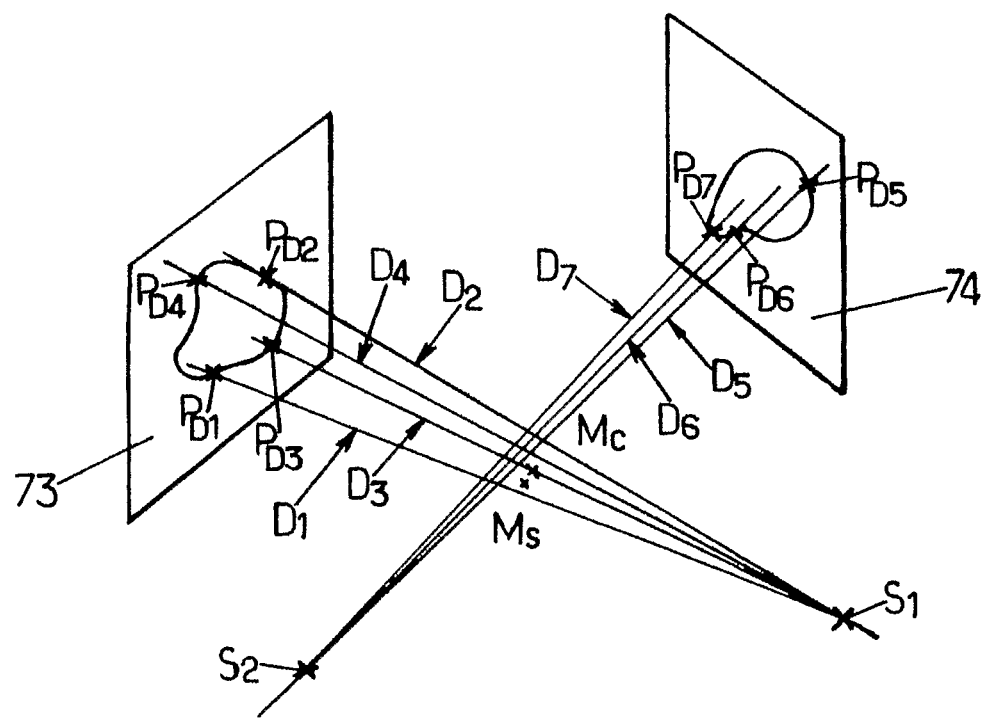

FIGS. 7A and 7B illustrate an example of a method for matching marks according to a first embodiment. This method may for example be applied after a segmentation of the detection and simulation data.

On FIG. 7A, reference 72 corresponds to simulation data obtained with a source $S_1$ virtually having a same location as one of the sources 5, 11 on FIG. 1. For an extracted mark $P_s$, a straight line 70 is virtually drawn between the point $P_s$ and the source $S_1$. A segment 71 is defined as the portion of the line 70 that intersects the solution model 79. A specific point $M_s$ is defined as having a determined position within the segment 71, such as a middle position.

On FIG. 7B, references 73, 74 correspond to radiographies obtained respectively from two sources 5, 11. For at least some of the extracted marks $P_{D1}, P_{D2}, P_{D3}, P_{D4}, P_{D5}, P_{D6}, P_{D7}$ straight lines $D_1, D_2, D_3, D_4, D_5, D_6, D_7$ are drawn between these marks and points S1, S2 virtually having a same location as the sources 5, 11 respectively. For each specific point $M_s$ obtained from a corresponding mark $P_s$ of the simulation data, a closest point $M_c$ is sought among the points of the straight lines D1, D2, D3, D4, D5, D6, D7.

One may use a Euclidean distance for the seeking, or any other distance, e.g. a Mahalanobis distance.

The specific point $M_s$ and the closest point $M_c$ are considered as matched. One may considers that the specific point $M_s$ is also matched with the points of the radiographies that correspond to the closest point $M_c$.

The marks extracted from the simulation data may correspond to X-rays having crossed relatively thick tissues. Selecting a specific point in the inside of the corresponding segment, e.g. a middle point, may allow avoiding errors due to a selecting of an end point, i.e. a point of a surface of the solution model.

In a second, alternative, embodiment, in particular if an intensity-based processing is performed on the simulation data and on the detection data, extracted marks of the detection data may be directly matched with extracted marks of the simulation data. For example, the point having a highest intensity within a determined window in the simulation data may be matched with the point having the highest intensity in a same window within the detection data. A possible filtering step may allow eliminating noise in the detection of marks.

That is, the matched data belong to the detection data and to the simulation data respectively. In the embodiment illustrated by FIGS. 7A and 7B, the matched data are only obtained from the detection data and the simulation data respectively.

Advantageously, in step 46 of FIG. 4, several couples of marks are matched.

In the embodiment wherein the preliminary solution comprises a cortical bone thickness value for each anatomical region, e.g. the posterior rim, the pedicle, etc., the marks extracted from the simulation data may be associated to an anatomical region, thus allowing a less erroneous matching.

The invention is by no means limited by the matching method.

Referring back to FIG. 4, in a registration step 47, one estimates the modifications to apply to the solution model so as to bring into concordance the matched marks.

If the matching step 46 is performed according to the first embodiment, some matched data, i.e. the specific points, are part of the solution model. In the registration step 47, one estimates the modification to bring to the solution model based on these specific points.

If the matching step 46 is performed according to the second embodiment, the matched data belong either to the simulation data or to the detection data. The registration step thus comprises estimating modification(s) to apply to the solution model based on these matched data. The registration step may thus take into account of how to obtain the three-dimensional solution model from the two-dimensional simulation data.

With the second embodiment, the matching step may allow obtaining two sets of matched marks, each set corresponding to one of the two radiographies. That is, marks of a radiography taken from a given source are matched with marks of simulation data obtained by simulating radiography from this source. The three-dimensional modification to apply to the solution model may be estimated from both sets of matched marks. For example, the registration step 47 comprises estimating two groups of modifications, each group comprising modifications to apply to the two-dimensional simulation data corresponding to a given source; the modifications to apply to the three-dimensional solution model are estimated from these two groups of modifications.

The present invention is not limited by the implementation of the registration step.

The modification may comprise a rigid transformation, e.g. a transformation corresponding to a translation and/or a rotation in 3D space of the solution model.

The modification to the preliminary solution could also be, for example, a linear deformation of the model solution by applying a homothetic transformation and/or a rotation.

The modification may comprise a non-linear rigid transformation such as kriging, such as for example described in Trochu, "A contouring program based on dual kriging interpolation", Engineering with Computers, 9(3), 160-177, 1993, or any other suitable method.

The estimated modification is applied in a step 48 in FIG. 4. The solution model and the corresponding preliminary solution are thus modified. In an embodiment, only the surface data of the preliminary solution are modified. In an alternative embodiment, bulk data, such as thickness data, are also likely to be modified.

A matching threshold may be defined during the deformation. It is for example decided that if the distance between the matched points $M_s$ and $M_c$ in the three-dimensional space is over the matching threshold, then no correct match is possible for this given point (this might be due for example to poor quality acquisition data). Statistical inference on the database may then be used to supplement the missing matching information during the modification.

Advantageously, the reconstruction is performed iteratively, e.g. steps 43, 44, 46, 47 and 48 are likely to be repeated.

For example, at a step 49, a simulation or a simple projection of the modified solution model is performed for comparison with the detection data. If the simulated or projected data fit enough with the detection data, the solution model is considered as the reconstruction of the osteo-articular structure. Else, steps 43, 43, 44, 46, 47 and 48 are repeated.

Namely, within the scope of the invention, it should be understood that the "preliminary solution" (and the corresponding "solution model") may be directly provided from a base comprising a priori knowledge of the structure to be reconstructed, established from structure(s) of the same type, or may be obtained by a patient-specific reconstruction having a given accuracy, and that a method will be applied to this "preliminary solution" to obtain a more accurate personalised reconstruction. This more accurate personalised reconstruction could still itself be considered as a "preliminary solution" for a further implementation of the method in view of obtaining a further refined construction.

The method which was described above was by way of example only. The structure to be studied is not necessarily the spine, but could be any part of the body skeleton of a patient, either in a lying or standing position. The method was described using radiographs as a detection data. However, any other kind of suitable detection image data could be used within the scope of the invention. The data used is even not necessarily detection data, but could for example be any patient-specific image data. Further, in the described example, the initial solution of the personalized reconstruction was a three-dimensional initial solution, but the invention is not intended to be limited to the specific embodiment, and a three-dimensional personalised reconstruction could for example be obtained from a bi-dimensional initial solution.

Figure 8:
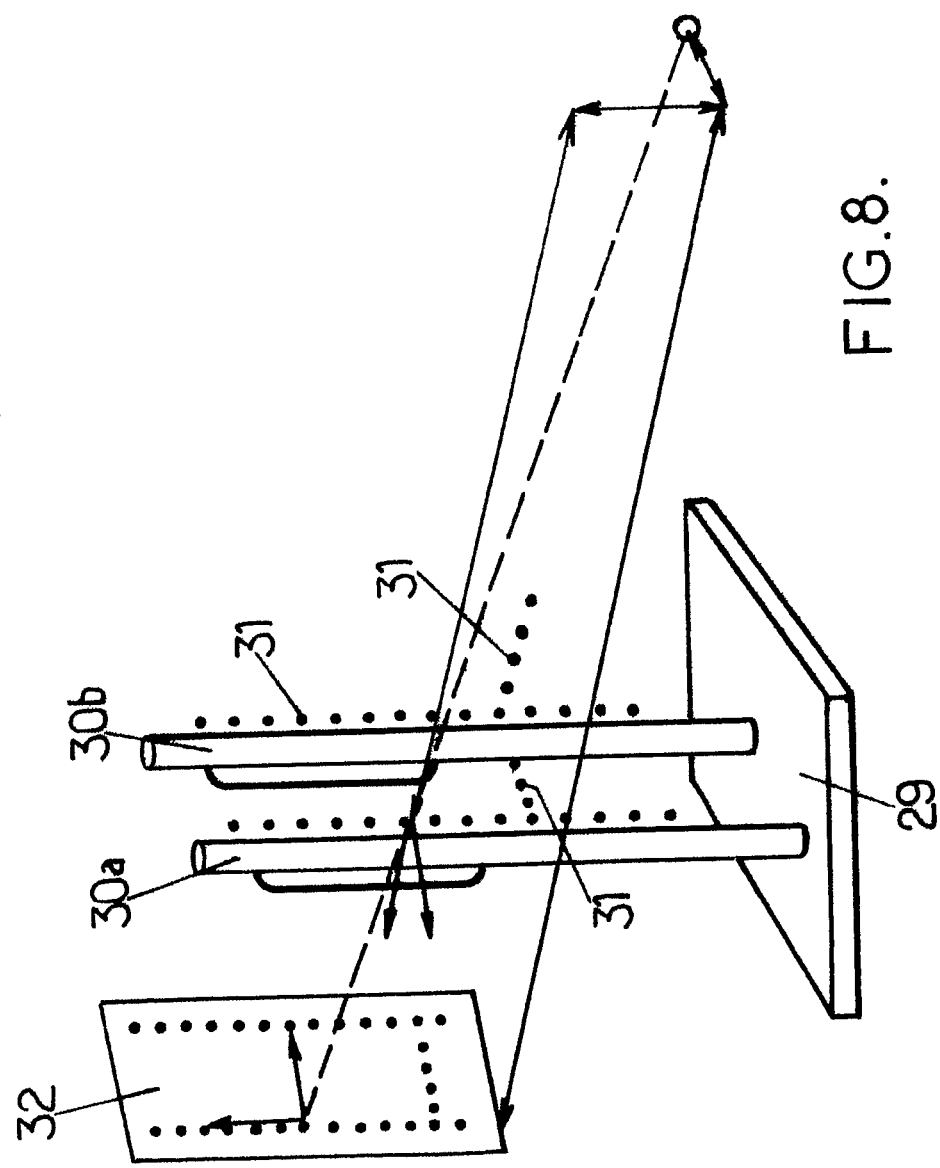
FIG. 8 is a schematic perspective view of another possible embodiment for an installation.

In particular, the acquisition scheme is not limited to the one presented in relation to FIG. 1, wherein a lateral and an antero-posterior images of the structure are obtained simultaneously. One could use other kind of acquisition apparatus, such as the one shown on FIG. 8 comprising a platen 29 and two posts 30a, 30b extending vertically and comprising radio-opaque markers 31 positioned in three-dimensional space so that their detection on the obtained detection data 32 will be used for calibrating the images respective to each other. The platen 29 will be movable relative to the radiological source in order to take a plurality of images of the patient standing on the platen along different orientations.

The invention claimed is:

1. A computer-implemented method for reconstruction of a three-dimensional model of an osteo-articular structure of a patient, comprising the steps of (a) providing bi-dimensional patient-specific image data of said structure;
   (b) at least one preliminary solution, corresponding to a previously established solution model of the structure, is provided from a base, said preliminary solution comprising a priori knowledge of the structure to be reconstructed, previously established from structures of the same type as the structure to be reconstructed, said preliminary solution comprising surface data describing coordinates of a surface of the solution model, and bulk data describing at least one characteristic of inside of the solution model;
   (c) modifying the preliminary solution in concordance with said patient-specific image data, wherein, in step (c), two-dimensional simulation data are obtained by simulating acquisition from at least one source on the preliminary solution, a position of the simulated source being obtained from the position of a source when acquiring the patient-specific image data, the simulated acquisition taking into account the bulk data;

wherein step (c) further comprises:
processing the patient-specific image data to extract marks, processing the simulation data to extract marks,
matching at least one mark obtained from the simulation data with at least one mark obtained from the patient-specific image data, based on the extracted marks;
wherein matching comprises:
defining a straight line passing via a determined mark extracted from the simulation data and via a determined point used as a source of the patient-specific image data,
defining a segment formed by the intersection of the straight line and of the solution model, seeking among points of at least one beam of straight lines the closest point of a specific point of the segment, each straight line of the beam being defined as passing via a point used as a source of the patient-specific image data and via a corresponding mark extracted from the patient-specific image data, and matching the specific point with the closest point;
generating and outputting a three dimensional reconstructed model of the osteo-articular structure of a patient based on the matching.

2. The method according to claim 1, wherein step (c) comprises:
matching a mark obtained from the patient-specific image date with a mark obtained from the preliminary solution, and
modifying the preliminary solution so as to bring in concordance the matched marks.

3. The method according to claim 1, wherein
the bulk data comprise thickness data relating to a thickness of an outer layer of the solution model.

4. The method according to claim 1, wherein
the bulk data comprise density data relating to a density of a portion of the solution model.

5. The method according to claim 1, wherein
the bulk data comprise inner surface data describing the coordinates of an inner surface of the solution model, said inner surface being distinct from the surface described by the surface data.

6. The method according to claim 1, wherein at step(c)
the preliminary solution is modified such that the corresponding solution model has a position and an orientation that is roughly consistent with the patient specific data.

7. The method according to claim 1, wherein
the simulation is performed using an equation of x-rays attenuation as a function of properties of the crossed tissues, at least one value of said properties being given by the bulk data.

8. The method according to claim 1, further comprising:
estimating modifications to apply to the preliminary solution so as to bring in concordance the matched marks, and
modifying the preliminary solution according to the estimated modifications.

9. The method according to claim 1, wherein processing comprises segmenting the patient-specific image data and the simulation data respectively.

10. The method according to claim 9, wherein the processing steps comprise extracting particular geometrical features using an intensity-based method.

11. The method according to claim 1, wherein, during step (c), the solution model is modified by applying one or more of the following:
a three-dimensional rigid transformation to said solution model, a three-dimensional linear deformation to said solution model,
a three-dimensional non-linear deformation to said solution model.

12. The method according to claim 1, wherein, at step (a), patient-specific image data of said structure is provided comprising two calibrated bi-dimensional radiographs of the body structure taken from different orientations.

13. The method according to claim 1 wherein step (c) is at least partially performed iteratively, the preliminary solution used in a subsequent iteration being obtained from the modification performed at the previous iteration.

14. A computer program product stored on a non-transitory computer-readable medium comprising a database of at least one preliminary solution corresponding to a solution model of a structure, said database being use with a processor to perform a method according to claim 1 for reconstruction of a three-dimensional model of a patient-specific osteo-articular structure based on patient-specific image data, said at least one preliminary solution comprising a priori knowledge of the structure to be reconstructed, previously established from structures of the same type as the structure to be reconstructed, at least one preliminary solution comprising surface data describing coordinates of a surface of the solution model, and bulk data describing at least one characteristic of inside of the solution model.

15. A computer-implemented method for reconstruction of a three-dimensional model of an osteo-articular structure of a patient, comprising the steps of
  (a) providing bi-dimensional patient-specific image data of said structure;
  (b) providing at least one preliminary solution, corresponding to a previously established solution model of the structure, from a base, said preliminary solution comprising a priori knowledge of the structure to be reconstructed, said preliminary solution comprising surface data describing coordinates of a surface of the solution model, and bulk data describing at least one characteristic of inside of the solution model;
  (c) modifying the preliminary solution in concordance with said patient-specific image data, wherein, in step (c), two dimensional simulation data are obtained by simulating acquisition from at least one source on the preliminary solution, a position of the simulated source being obtained from the position of a source when acquiring the patient-specific image data, the simulated acquisition taking into account the bulk data by using an equation of rays attenuation as a function of density;
wherein step (c) further comprises:
processing the patient-specific image data to extract marks, processing the simulation data to extract marks,
matching at least one mark obtained from the simulation data with at least one mark obtained from the patient-specific image data, based on the extracted marks;
wherein matching comprises:
defining a straight line passing via a determined mark extracted from the simulation data and via a determined point used as a source of the patient-specific image data,
defining a segment formed by the intersection of the straight line and of the solution model, seeking among points of at least one beam of straight lines the closest point of a specific point of the segment, each straight line of the beam being defined as passing via a point used as a source of the patient-specific image data and via a corresponding mark extracted from the patient-specific image data, and matching the specific point with the closest point;
generating and outputting a three dimensional reconstructed model of the osteo-articular structure of a patient based on the matching.

* * * * *